United States Patent [19]
Goffena

[11] Patent Number: 5,765,447
[45] Date of Patent: Jun. 16, 1998

[54] MECHANICAL CABLE SYSTEM HAVING A BELLOWS SEAL

[75] Inventor: Donald G. M. Goffena, Camp Verde, Ariz.

[73] Assignee: W. L. Gore & Associates, Inc., Newark, Del.

[21] Appl. No.: 625,017

[22] Filed: Mar. 29, 1996

[51] Int. Cl.$^6$ ........................................... F16C 1/26
[52] U.S. Cl. ......................................... 74/502.6; 74/502.5
[58] Field of Search ........................... 74/502.4, 502.5, 74/502.6

[56] References Cited

U.S. PATENT DOCUMENTS

| | | |
|---|---|---|
| 609,570 | 8/1898 | Bowden . |
| 2,845,812 | 8/1958 | Pobar ............................. 74/502.4 |
| 3,369,426 | 2/1968 | Matz, Jr. . |
| 3,994,185 | 11/1976 | Gilardi ............................. 74/502.5 |
| 4,304,148 | 12/1981 | Hamman . |
| 4,304,149 | 12/1981 | Heimann . |
| 4,321,840 | 3/1982 | Kalamon ...................... 74/502.4 X |
| 4,534,239 | 8/1985 | Heimann . |
| 4,541,303 | 9/1985 | Kuzunishi . |
| 4,621,937 | 11/1986 | Maccuaig ..................... 74/502.4 X |
| 4,716,781 | 1/1988 | Dussault . |
| 4,773,279 | 9/1988 | Spease et al. ..................... 74/502.4 |
| 4,889,005 | 12/1989 | Crack ........................... 74/502.4 X |
| 4,963,050 | 10/1990 | Wendt et al. ................... 74/502.4 X |
| 5,039,138 | 8/1991 | Dickirson . |
| 5,079,967 | 1/1992 | LaCava . |
| 5,105,682 | 4/1992 | Jung ............................... 74/502.4 |
| 5,199,320 | 4/1993 | Spease et al. . |
| 5,353,626 | 10/1994 | Davidson et al. . |
| 5,360,945 | 11/1994 | Truesdale, Jr. et al. . |
| 5,363,719 | 11/1994 | Johnson et al. . |

FOREIGN PATENT DOCUMENTS

| | | |
|---|---|---|
| 397008 | 11/1990 | European Pat. Off. . |
| 978315 | 12/1964 | United Kingdom . |

OTHER PUBLICATIONS

'96 Shimano Bicycle System Componets Dealer Sales and Support Manual, Shimano Inc., Aug. 1995; pp. 25, 72.
Ride On® Cable System drawing. Nov. 1995.

*Primary Examiner*—Charles A. Marmor
*Assistant Examiner*—Mary Ann Battista
*Attorney, Agent, or Firm*—Wayne D. House

[57] ABSTRACT

A mechanical cable system having a tubular housing, conventionally of metal, enclosing a polymeric tubular liner which in turn contains an axially movable length of cable, wherein the end of the polymeric tubular liner extends beyond the end of the housing. A bellows seal is provided to prevent ingress of contaminants between the cable and the end of the housing. The bellows seal has a first end which seals interferably around the outer surface of the cable; the opposite, second end seals interferably around the end of the polymeric tubular liner which extends beyond the end of the housing. Because there is no motion between the ends of the bellows seal and the surfaces to which they are interferably fitted, the seal has a long life and is effective at preventing ingress of contaminants.

8 Claims, 2 Drawing Sheets

MECHANICAL CABLE SYSTEM HAVING A BELLOWS SEAL

FIELD OF THE INVENTION

The present invention relates to the field of mechanical cable systems fitted with seals.

BACKGROUND

Mechanical control cable systems comprising flexible tubular metal housings containing an axially movable cable have been commonly used for the transmission of motion since their invention by Ernest Bowden (English Patent 25,325 and U.S. Pat. No. 609,570). The flexible tubular housing provides axial compression resistance against the tension of the axially movable cable.

There are many applications of mechanical cables when it is considered advantageous to fit a seal between the end of the cable housing and the cable to reduce the ingress of dirt, water and any other contamination at the point of exit of the cable from the housing. The entry of contamination at this point results in increased operating friction, increased rate of wear and the resultant need to more frequently adjust the cable in order to allow it to continue accurate operation. Both bellows seals and O-rings have been used on mechanical cable systems. Frequently, these seals involve a sliding seal wherein the O-ring or one end or both ends of the bellows seal slides on the surface of the cable during axial motion of the cable. For example, the "'96 Shimano Bicycle System Components Dealer Sales and Support Manual" describes a cable system which uses a flexible housing having a polymeric tubular liner with both of those components cut to the same length so that the ends of the housing and liner coincide. The end of the housing is fitted with a ferrule having a tubular extension of inside diameter that is about the same as that of the liner. One end of a seal is fitted over the tubular extension of the ferrule while the opposite end of the seal is fitted interferably about the cable wherein the opposite end slides axially on the surface of the cable, thereby functioning as a scraper seal. This ferrule is frequently used with an additional scraper seal within its interior and located between the end of the housing and the adjacent end of the tubular extension. While scraper seals such as these are effective for a time, the sliding motion results in wear of both the seal and the cable surface; likewise, this relative motion increases the operating friction of the system.

SUMMARY OF THE INVENTION

The present invention relates to a mechanical cable system comprising a flexible tubular housing, conventionally made of metal, which coaxially encloses a tubular polymeric liner, an end of which extends in length beyond an end of the housing. The polymeric tubular liner contains a length of axially movable cable. A bellows seal is provided which has opposing first and second ends, wherein the first end is fitted to and interferably seals around the outer surface of the cable and the second end is fitted to and interferably seals around the extended end of the polymeric tubular liner. The bellows seal fits to and interferably seals to these surfaces with a degree of interference appropriate to maintain each respective end of the bellows seal in a substantially stationary, non-moving relationship with the surface to which it is fitted; in this fashion both ends of the seal move with the surfaces to which they are fitted and therefore neither end of the seal functions as a sliding, scraper seal with the attendant friction and wear associated with such a seal. Typically a fitting is attached to the end of the cable immediately or approximately adjacent to the first end of the bellows seal; the fitting is used to connect the cable to the apparatus intended to move or be moved by the cable. However, the seal is not required to be located near an end of the cable.

Because there is no axial, sliding motion between the bellows seal and the surfaces to which they are fitted, the seal has a long life and is effective at preventing ingress of contaminants.

The system of the present invention is also advantageous in that the first end of the bellows seal fits and seals interferably around the outer surface of the end of the cable so that it moves with the cable, allowing it to be used for a wide variety of applications regardless of the type of cable termination or the type of apparatus that the end of the cable is connected to. Conventionally, one end of most bellows seals used with mechanical cables has been used either as a scraper seal or alternatively fitted to a housing or other apparatus to which the cable is connected. The specialized form of the end of a bellows seal necessary to allow it to seal to such housings or other apparatus prevents those seals from being used in other, different applications. In contrast, the design of the bellows seal for use with the system of the present invention is far more universal, sealing to the outer surface of the cable rather than the housing or apparatus to which the end of the cable is connected.

Preferably, the flexible tubular metal housing is provided with an exterior polymeric covering for improved cleanliness and for additional physical protection; also it is preferred to provide the cable with a polymeric covering having good abrasion resistance and good lubricity. It is most preferred that both components are provided with polymeric coverings. In the case of the polymeric covered cable, the first end of the bellows seal can be fitted interferably around the polymeric covering at the end of the cable adjacent to the provided fitting.

The inventive mechanical cable system is anticipated to be useful in a variety of applications, but is expected to have particular utility as a gearshift cable and/or brake cable for bicycles. Bicycles, particularly mountain bikes, are exposed to high levels of contamination, use gear shifting apparatus that require a high degree of consistent precision in operation and are required to be light in weight. The attributes of the present invention are well suited to such an application. The system is easily adapted to a variety of applications in that the bellows seal seals to the polymeric liner and the cable and therefore is not required to fit specialized components of the apparatus to which it is fitted.

The inventive system may also be used in conjunction with the mechanical system described by U.S. Pat. No. 5,353,626, also assigned to the assignee of the present invention. This patent, incorporated herein by reference, describes a light weight mechanical cable system that is particularly useful for bicycles.

Materials for the various components of the mechanical cable system are generally known.

A particularly preferred polymeric covering for the cable is porous, expanded PTFE as provided on bicycle cables available from W.L. Gore and Associates, Flagstaff, Ariz. Suitable materials for the bellows seal are also conventional and include natural rubber, synthetic rubber and various other flexible polymers such as silicone rubber (polydimethyl siloxane).

The use of a bellows seal as described above can provide an additional advantage in some applications. If the bellows is constructed of a polymeric material having some degree of stiffness, such as a silicone rubber of, for example about 50–70 durometer in a wall thickness of about 0.7 mm, the bellows has additional utility as a compression spring (or alternatively a tension spring) which provides an assisting operating force and thereby reduces the required additional operating force. Conversely, the bellows may be used in tension or compression, depending on the end of the housing to which it is fitted whereby it provides an assisting return force after release of an applied operating force.

The appropriate amount of interference between the ends of the bellows seal and the surfaces to which they are fitted and to which they interferably seal must be determined for the specific application. For use on a bicycle gearshift cable, a diametrical interference of about 20 percent of the cable diameter was appropriate for the first end of a bellows seal of 5 mm overall outside diameter and 0.7 mm thickness measured parallel to the longitudinal axis of the system, wherein the bellows seal was made from 70 durometer silicone rubber. The diameter of the interference hole in the first end of the bellows seal was thus about 1.0 mm, fitted over a 1.2 mm total diameter polymer covered cable. Alternatively, the same bellows was used on a bicycle brake cable system with a 30 percent interference.

DETAILED DESCRIPTION OF THE INVENTION

Figure 1:
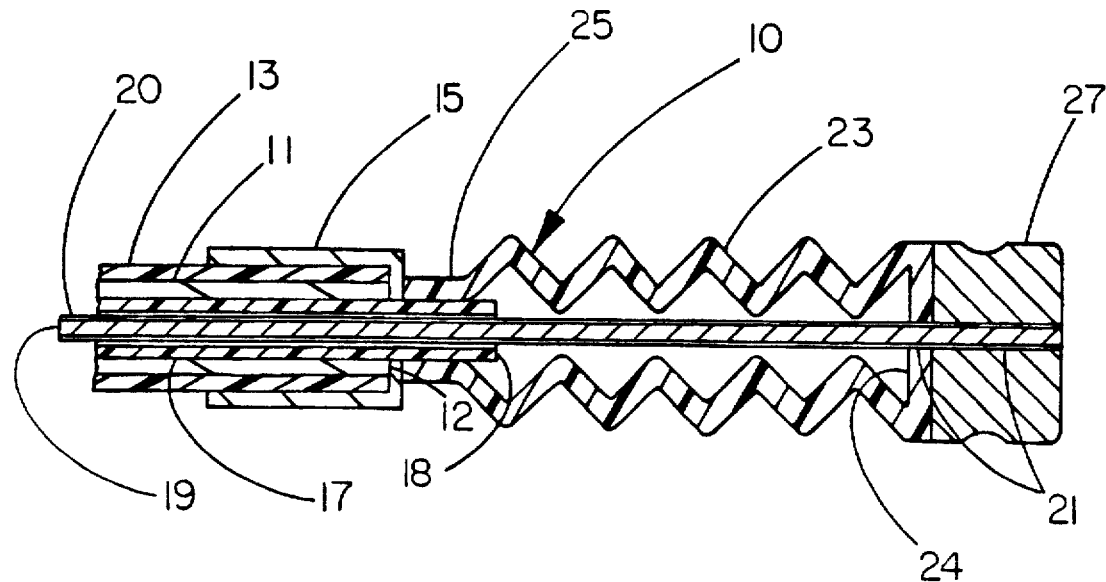
FIG. 1 describes a longitudinal cross section of the preferred embodiment of the present invention.

FIG. 1 describes the preferred embodiment of the present invention 10 in a longitudinal cross sectional view wherein a flexible tubular metal housing 11 encloses a polymeric tubular liner 17 which in turn contains an axially movable length of cable 19. Cable 19 is optionally and preferably provided with a polymeric covering 20 which is both lubricious and abrasion resistant. Cable end 21 is provided with fitting 27 which may take any form appropriate to allow the cable end 21 to be connected to either an actuating device or an actuated device as desired. The outer surface of housing 11 is optionally and preferably provided with an exterior polymeric jacket 13; a ferrule 15 is optionally and preferably provided over the end 12 of housing 11. The end 18 of the polymeric tubular liner 17 extends beyond the end 12 of the housing 11 and beyond ferrule 15 as well. The mechanical cable system of the present invention incorporates a bellows seal 23 having a first end 24 fitted to and interferably sealing around cable end 21. If cable 19 is provided with the optional polymeric covering 20, then the first end 24 of bellows seal 23 should be fitted to and interferably seal around the outer surface of the polymeric covering 20. The second end 25 of bellows seal 23 is fitted to and interferably seals around the end 18 of the polymeric tubular liner 17. During normal use, both the first and second ends remain fitted to the stated components and do not move slidably with respect to those components, thereby minimizing friction and wear and maintaining an effective seal for a longer period of time than could be expected from sliding seals such as O-rings.

As suggested by FIG. 1, with the mechanical cable system in the neutral state (no actuating force applied to the system), the bellows seal may be installed in compression, tension, or under no force at all, depending on the desirability of taking advantage of the spring effect of the bellows seal when under compression or tension.

Figure 2:
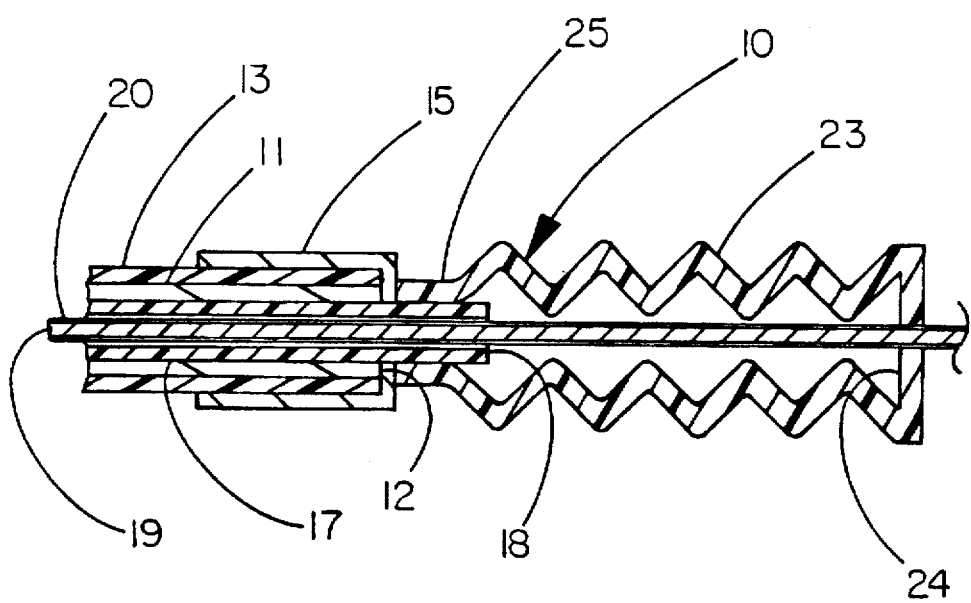
FIG. 2 describes a longitudinal cross section of an alternative embodiment wherein the first end of the bellows seal is fitted to the outer surface of the cable at a location other than adjacent to an end fitting.

FIG. 2 describes an alternative embodiment wherein the first end 24 of bellows seal 23 is fitted to and interferably seals to the outer surface of cable 19 at a system location other than immediately adjacent to fitting 27.

Figure 3:
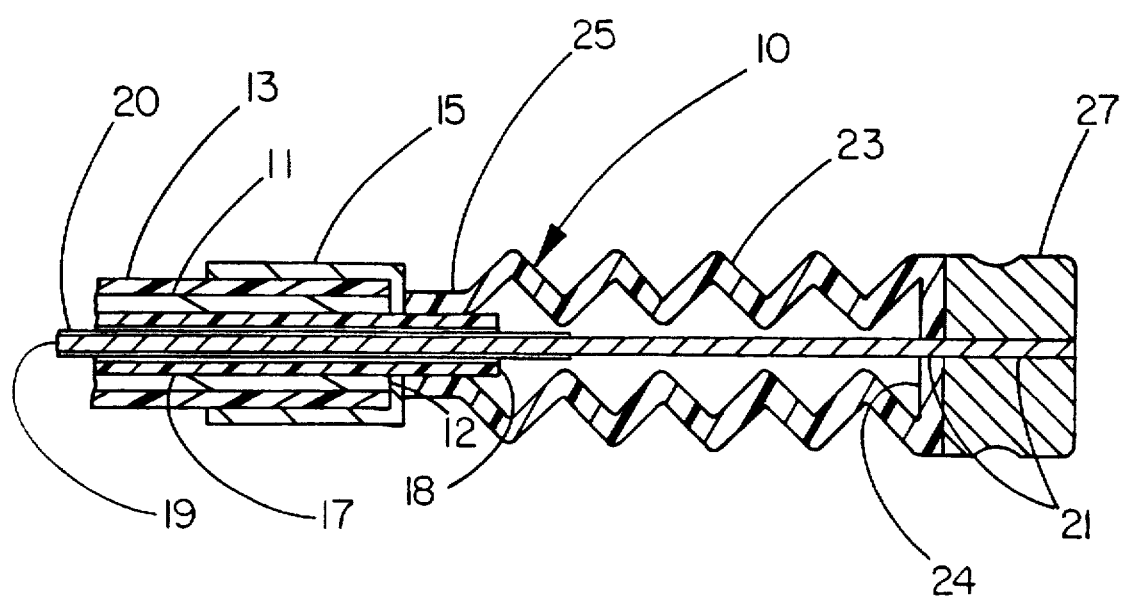
FIG. 3 describes a longitudinal cross section of an alternative embodiment wherein a cable is used having a polymeric covering which has been removed from the end of the cable in the region of the end fitting and the first end of the bellows seal.

FIG. 3 describes an alternative embodiment wherein the polymeric covering 20 of the cable 19 has been removed at the cable end 21. Fitting 27 and the first end 24 of bellows seal 23 are consequently fitted and interferably seal to the bare metal surface of the cable end 21. It is apparent that the first end 24 of the bellows seal may be fitted and interferably seal to either a bare metal cable surface or alternatively the polymeric cable covering 20 of cable 19. Regardless, the first end 24 of bellows seal 23 must fit and interferably seal around the end of the cable with an amount of interference appropriate to maintain the position of the first end 24 of bellows seal 23 in a substantially immovable fashion with respect to the cable, wherein the first end 24 of the bellows seal 23 moves with cable 19 as the cable 19 is moved with respect to housing 11.

We claim:

1. A mechanical cable system comprising:
   a). an elongated flexible tubular cable housing coaxially enclosing a polymeric tubular liner, wherein the polymeric tubular liner has an outer surface and has an end which extends beyond an end of the tubular cable housing; and
   b). a length of cable located within the polymeric tubular liner, the length of cable being axially movable with respect to the polymeric tubular liner, the length of cable having a diameter, an outer surface and an end which extends beyond the end of the polymeric tubular liner, and
   c). a bellows seal enclosing the cable adjacent to the end of the tubular cable housing, said bellows seal having first and second opposing ends, wherein said first end fits and seals interferably to the outer surface of the end of the cable and the second end fits and seals interferably directly to the outer surface of the end of the polymeric tubular liner which extends beyond the end of the cable housing;

wherein during axial movement of the cable within the polymeric tubular liner, the first end of the bellows seal does not move with respect to the outer surface of the cable to which it is fitted and the second end of the bellows seal does not move with respect to the end of the polymeric tubular liner to which it is fitted.

2. A mechanical cable system according to claim 1 wherein the cable end is provided with a polymeric covering and with a fitting affixed to the cable end, and wherein the first end of the bellows seal seals interferably to the polymeric covering of the cable end adjacent to the fitting.

3. A mechanical cable system according to claim 2 wherein the bellows seal is comprised of polydimethyl siloxane.

4. A mechanical cable system according to claim 1 wherein the bellows seal is comprised of polydimethyl siloxane.

5. A mechanical cable system according to claim 1 wherein, following axial compression of the bellows seal by axial motion of the cable within the polymeric liner, and subsequent release of the axial compression, the bellows seal exerts an axially extensive force in a direction opposite to the axial compression.

6. A mechanical cable system according to claim 1 wherein the flexible tubular cable housing has an exterior surface and is provided with a polymeric jacket around the exterior surface of the housing.

7. A mechanical cable system according to claim 1 wherein the cable end is provided with a fitting affixed thereto, and wherein the first end of the bellows seal seals interferably to the cable adjacent to the fitting.

8. A mechanical cable system according to claim 7 wherein the bellows seal comprises polydimethyl siloxane.

* * * * *